United States Patent Office 3,567,686
Patented Mar. 2, 1971

3,567,686
POLYCARBONATES
Ronald E. White, Romeo, and Zachariah G. Gardlund, Utica, Mich., assignors to General Motors Corporation, Detroit, Mich.
No Drawing. Filed Aug. 27, 1969, Ser. No. 853,495
Int. Cl. C08g 17/13
U.S. Cl. 260—47                                                     3 Claims

ABSTRACT OF THE DISCLOSURE

Linear polycarbonate resins containing many pendant ester groups and possessing the general structural formula

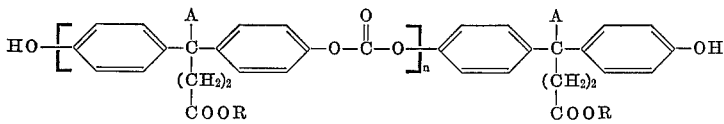

wherein:

A is a radical selected from the group consisting of —H, —CH$_3$, and —C$_6$H$_5$;

R is an alkyl group containing one to eighteen carbon atoms and n is an integer in the range of 40 to 70 inclusive, are converted to the corresponding linear polycarbonate resins containing a large number of pendant hydroxyl groups only by reduction of the ester group with diborane (B$_2$H$_6$). The hydroxyl groups thus produced in the polycarbonate molecular chain are useful as grafting and cross-linking sites for further reaction with organic and organic-inorganic moieties to provide modified polycarbonates with enhanced physical properties.

---

This invention relates to linear polycarbonates and more particularly it relates to linear polycarbonates having reactive pendant hydroxyl groups on the molecular chains thereof.

It is an object of the present invention to provide polycarbonate-type synthetic resins containing a large number of hydroxyl groups along the molecular backbone which groups are reaction sites for subsequent grafting or cross-linking operations with respect to the polycarbonate resin.

It is another object of the present invention to provide a method of forming a linear polycarbonate containing pendant hydroxyl groups in up to about 90% of the monomeric units along the molecular chain thereof, which method involves the treatment of known polycarbonate resins containing pendant ester groups with diborane (B$_2$H$_6$) to effectively and selectively reduce the ester groups to hydroxyl groups without substantially degrading the polymer itself.

In accordance with a preferred embodiment of our invention these and other objects are accomplished by first providing a bis-phenol acid ester. This bis-phenol acid ester possesses the general structural formula:

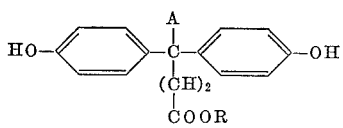

wherein:

A is a radical selected from the group consisting of —H, —CH$_3$, and —C$_6$H$_5$, and R is an alkyl group containing one to eighteen carbon atoms.

These esters are prepared by the reaction of a desired alcohol with a suitable bis-phenol acid. The alcohol is a member of the series of saturated aliphatic alcohols running from methyl alcohol up to and including stearyl alcohol. The bis-phenol acid is prepared in a known manner by the condensation of phenol with the suitable keto acid or keto ester such as levulinic acid. The prepared bis-phenol acid ester is then reacted with an equimolar amount of phosgene in a suitable solvent at about room temperature to produce a hydroxy terminated polycarbonate containing a large number (40 to about 70) of pendant ester groups. Upon isolation of the esterified polycarbonate from its reaction medium, the pendant ester groups are chemically reduced to —CH$_2$OH groups with diborane (B$_2$H$_6$), preferably in tetrahydrofuran solvent. The pendant hydroxyl groups thus formed are useful for cross-linking sites such as by reaction with diisocyanates or grafting with various organic and organic-inorganic moieties.

These and other objects and advantages of our invention will become more apparent in view of a detailed description thereof which follows.

Because of the inherent structure of the starting monomers (derivatives of bis-phenol) used to produce polycarbonates, it has heretofore been impossible to synthesize a polycarbonate polymer containing a carbonate repeating unit along with a repeating hydroxyl group. There is no general method of introducing repeating hydroxyl groups directly into the polymer because if such groups are present in the bis-phenol monomer they are consumed by the phosgene during polymerization. At the same time, prior to our invention, there were no techniques of introducing repeating pendant hydroxyl groups into a formed polymer. In general, the process aspects of our invention involve the chemical reduction of known linear polycarbonates containing repeating pendant ester groups to the corresponding linear carbonate containing repeating pendant hydroxyl groups by treatment of the polymer with diborane. The diborane only slowly attacks the carbonate linkages and therefore does not drastically degrade the polymer chain during the reduction reaction. Reduction by other means, such as lithium aluminum hydride, basic hydrolysis or acidic hydrolysis does not give the desired result. In the case of lithium aluminum hydride, for example, only slight ester reduction occurs but substantial carbonate reduction takes place and degradation of the polymer is extensive. Neither basic nor acidic hydrolysis effects any substantial ester reduction, but basic hydrolysis degrades the polymer severely. Therefore, these common methods for reducing ester groups are not applicable to polycarbonate system.

In general, the starting material for our process is a linear polycarbonate containing pendant ester groups of the type depicted in the following structural formula:

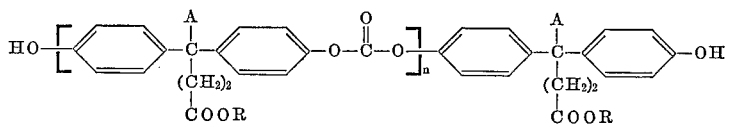

wherein:

A is a radical selected from the group consisting of —H, —CH$_3$ and —C$_6$H$_5$;

R is an alkyl group containing one to eighteen carbon atoms, and $n$ is an integer in the range of 40 to about 70 inclusive.

These are known polymeric substances (see e.g., U.S. 3,132,118) prepared by reacting the above-described bis-phenol acid ester with a substantially equimolar amount of phosgene in a known manner. The bis-phenol acid ester is prepared by esterification of the corresponding bis-phenol acid, which is, in turn, formed by condensation of phenol with a suitable keto-acid or keto-ester such as those specified above.

The formation of the bis-phenol acid ester is carried out by reacting an alcohol of the saturated aliphatic series containing one to eighteen carbon atoms inclusively and a bis-phenol acid preferably of the type represented by the following general structural formula:

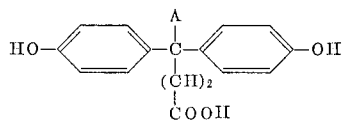

where A is a radical selected from the groups consisting of —H, CH$_3$ and —C$_6$H$_5$.

An excess of the alcohol is employed and the esterification reaction is conducted by heating the acid alcohol mixture to a temperature in the range of 80° to 120° C. Water is formed in the esterification reactions and should be continually removed. A solvent or solvent system may be used for the esterification reaction medium and if the reaction is conducted at reflux temperature, water can be removed by phase separation from the refluxing water immiscible solvent. Suitable esterification solvents are benzene, toluene, or xylene. Since acidic conditions favor the esterification reaction, catalytic amounts of acids such as dry hydrochloric acid are preferably used during the esterification. Esterification is generally complete in a period of from five to twelve hours. At the end of the esterification the solvent is removed by vacuum distillation at temperatures of less than 120° C. The resulting bis-phenol acid ester can be purified by recrystallization from hydrocarbon solvents. All of the alcohol should be removed from the ester so that a subsequent polymerization reaction is not abruptly terminated.

The bis-phenol acid ester is polymerized to a polycarbonate product containing repeating pendant ester groups by reaction with phosgene. The reaction is best carried out in a solvent or solvent system. Suitable solvents such as ether, benzene, toluene, and chlorinated solvents such as dichloromethane may be employed as the reaction medium. The phosgene and bis-phenol acid ester are reacted in equimolar amounts. The bis-phenol acid ester is dissolved in the solvent and the phosgene is bubbled through the solution in the form of a gas. If the phosgene is metered into the solution it is possible to determine when an approximately molecular equivalent amount of the material has been added to the solution. An excess of phosgene may be employed without harm to the polymeric product but an excess of the acid ester will reduce the average molecular weight of the product due to incomplete reaction.

The reaction between phosgene and the bis-phenol acid ester is accelerated by the use of a strong base which serves to eliminate the hydrogen chloride byproduct. Preferably, organic bases such as pyridine, quinoline or the like are employed. However, inorganic bases such as sodium hydride and potassium hydride may be used.

It is preferred that the exothermic reaction be conducted at about room temperature, generally in the range of 10° to 40° C., and preferably in the range of about 20°–25° C. The reaction temperature may be maintained within the preferred range by employing cooling water to withdraw heat from the reaction mixture.

At the completion of the reaction, when an equimolar or small excess of phosgene has been absorbed by the reaction solution, the linear polycarbonate product is recovered from the solvent system. Hydrochloric acid salts of organic bases formed during the reaction are precipitated and removed by filtering. Water can then be mixed with the solvent to precipitate the polymer therefrom in the form of a flocculant precipitate. The polycarbonate containing a pendant ester group in every monomeric unit is soluble in tetrahydrofuran, dimethylformamide and chloroform and may be reprecipitated from these solvents for purposes of purification. This ester group containing linear polycarbonate is the starting material for the process aspect of our invention.

A linear polycarbonate containing a pendant hydroxyl group in every monomeric unit is then formed by reduction of the pendant ester groups of the polycarbonate thus far produced. This is accomplished by reduction of the pendant ester groups to the hydroxyl groups by using diborane (B$_2$H$_6$) generated in situ (see Zwerfel and Brown, Organic Reactions, 13, 1 (1963)) or purchased commercially in a tetrahydrofuran solvent. A specific example will serve to illustrate the invention.

Two molar equivalents of phenol were condensed with levulinic acid

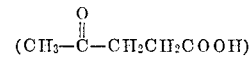

to form 4,4-bis-(p-hydroxyl phenyl) pentanoic acid. This acid was esterified with ethyl alcohol to form the ethyl ester thereof. The polycarbonate of the ethyl ester of the bis-phenol acid was then formed by a reaction of 0.1 mole of the ester with a 10% molar excess of phosgene in 250 ml. of anhydrous pyridine under a nitrogen atmosphere. The polymer was precipitated into water, washed with hot water and vacuum dried. The polymer was reprecipitated by pouring a chloroform solution thereof into methanol. In this instance the number average molecular weight of the polymer was 13,000 as determined by membrane osmometry at 45.0° C. in sym-tetrachloroethane.

Three grams of the above polycarbonate containing pendant ester groups was dissolved in 250 ml. of dry tetrahydrofuran. To this stirred solution at 0° C. was slowly added 50 ml. of a diborane solution in tetrahydrofuran (1.0 molar in BH$_3$) over a one hour period. Stirring at 0° C. was continued for twenty-four hours. The excess diborane was destroyed by adding 100 ml. of a 50:50 methanol:tetrahydrofuran mixture. The volume of the solution was reduced to 50 ml. and the polymer was precipitated therefrom by pouring into a 5% aqueous hydrochloric acid solution. The precipitated polymer was washed with water and dried overnight to yield 2.9 grams of reduced polymeric product. Infrared analysis of the product indicated virtually complete reduction of the ester group along with an increase in hydroxyl absorption but no decrease in carbonate absorption. The pendant —COOR groups on about 90% of the monomeric units were reduced to pendant —CH$_2$OH groups. The number average molecular weight of the product was 6500. This means that on the average the polymer chains were split in half during the reduction reaction. This is entirely acceptable when it is recognized that the product can be cross-linked by means of reaction with the pendant hydroxyl group produced by our process.

Our process may be employed to reduce linear polycarbonate resins containing pendant ester groups along the molecular chains thereof wherein the ester groups are of aliphatic alcohols containing one to eighteen carbon atoms and the products of our process may be represented generally by the structural formula:

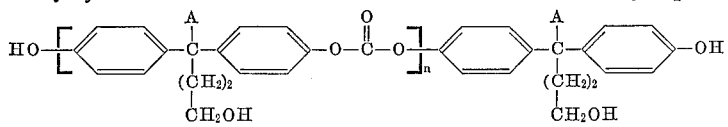

wherein

A is a radical selected from the group —H, —CH₃ and —C₆H₅, and n is an integer in the range of 20 to 35.

The polycarbonate product of our invention contains a plurality of pendant hydroxyl groups which are useful for both cross-linking and grafting purposes. We have observed that there may be a reduction of up to 50% in average molecular weight in going from the ester polycarbonate to hydroxyl polycarbonate which is due both to elimination of the pendant alkyl groups forming part of the ester and to some minor degradation of the polymer itself. We have observed no more than a 50% reduction in the number average molecular weight of the polymer following ester reduction with diborane. This would indicate that on the average no more than one carbonate linkage is being attacked by the diborane while some 40 to 70 ester group per molecule are being reduced to hydroxyl groups. Our polymeric product typically has an average molecular weight in the range of 6000 to 10,000. The properties of this pendant hydroxyl group containing polycarbonate may be modified by cross-linking by reaction with a diisocyanate, isocyanate terminated polyurethane prepolymers, diacids, or acid terminated polymers such as polyesters and the like. Another use for our invention is in the coating of polycarbonate optical members such as lenses and in windshields wherein our hydroxy-containing polycarbonate is applied to the surface of a conventional polycarbonate article for the purpose of further bonding abrasion resistant materials to our novel hydroxy-containing polycarbonate through the hydroxyl groups. This use of our novel polycarbonate is more completely described in a copending application Ser. No. 874,771, filed Nov. 7, 1969.

Diborane (B₂H₆) is the only known suitable reducing material for producing polycarbonate plastics containing hydroxyl groups along the main backbone by reduction of pendant ester groups. When an attempt was made to treat the polycarbonate employed in the above example with lithium aluminum hydride at room temperature, no significant reduction of the ester groups was obtained. When another sample of the polycarbonate prepared from a phenolic acid ester was treated with lithium aluminum hydride solution in tetrahydrofuran at reflux, almost complete degradation of the polycarbonate was experienced, the average molecular weight being reduced from 23,700 to 750.

An attempted hydrolysis of the pendant ester groups in sulphuric acid apparently had no effect on the pendant ester groups as an infrared analysis of the treated polymer showed no diminishment of the ester peak. However, treatment with diborane produces a polymeric product of relatively high molecular weight containing reactive hydroxyl groups along the backbone of the molecular chain thereof.

While our invention has been described in terms of a few specific embodiments thereof, it will be appreciated that other forms of the invention could readily be adapted by one skilled in the art. Therefore, the scope of our invention is to be considered limited only by the following claims.

We claim:

1. A method of forming polycarbonate-type, synthetic resins containing a plurality of reactive hydroxyl groups along the molecular chains comprising providing a polycarbonate of the type

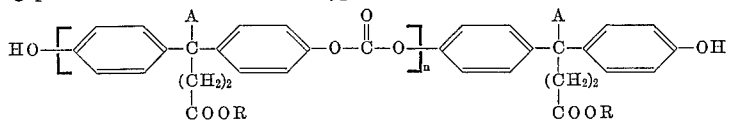

A is a radical selected from the group consisting of —H, —CH₃ and —C₆H₅; R is an alkyl group containing one to eighteen carbon atoms and n is an integer in the range of 40 to 70 inclusive and reducing the repeating pendant —COOR groups thereon to —CH₂OH groups with diborane.

2. A method of forming a linear polycarbonate resin containing repeating pendant hydroxyl groups along molecular chains thereof comprising providing bis-phenol acid ester of the type

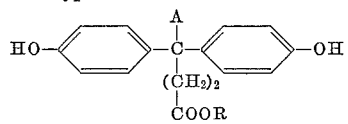

wherein A is a radical selected from the group consisting of —H, —CH₃ and —C₆H₅; and R is an alkyl group containing one to eighteen carbon atoms, polymerizing said bis-phenol acid ester with phosgene to form a linear polycarbonate containing repeating pendant ester groups as depicted in the structural formula:

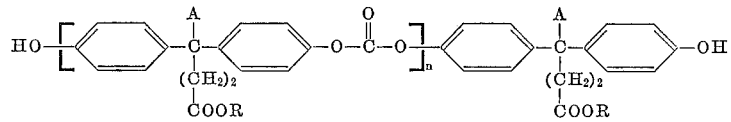

wherein A and R have the said values and n is an integer in the range of 40 to 70 inclusive, and reducing the pendant —COOR groups to —CH₂OH groups by reaction with diborane (B₂H₆).

3. Linear polycarbonates containing repeating pendant hydroxyl groups along the molecular chains thereof consisting essentially of the type generally represented by the structural formula:

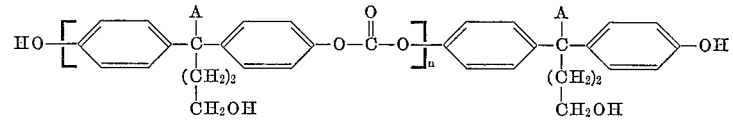

wherein A is a radical selected from the group consisting of —H, —CH₃ and —C₆H₅; and n is an integer in the range of 20 to 35 inclusive.

References Cited

UNITED STATES PATENTS 3,285,875  11/1966  Bottenbruch et al. _____ 260—47

SAMUEL H. BLECH, Primary Examiner

U.S. Cl. X.R.

117—138.8; 260—30.4, 32.6, 33.8, 858, 860